Patented Jan. 5, 1954

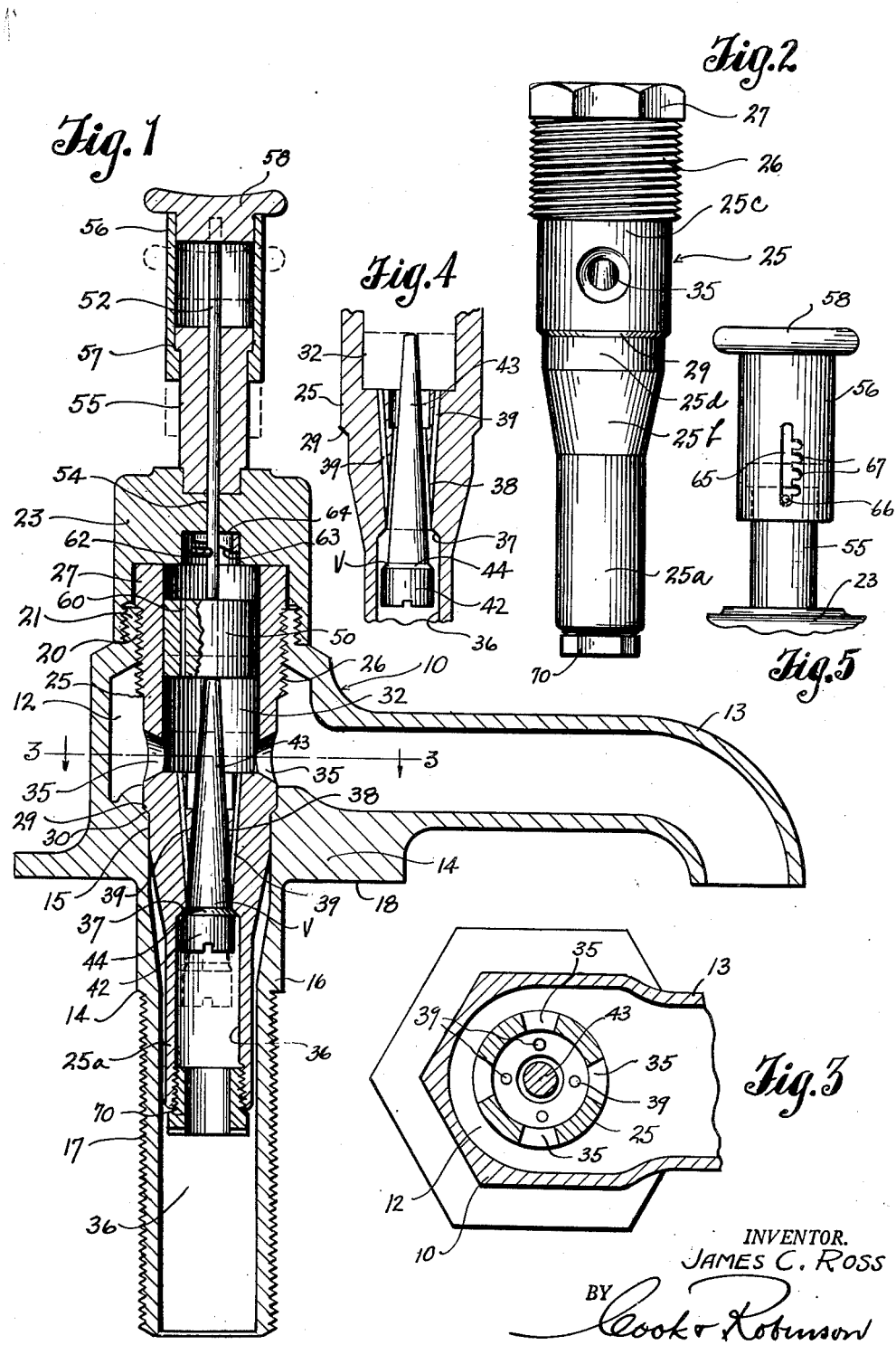

2,665,106

UNITED STATES PATENT OFFICE 2,665,106

ALL-METAL VALVE FAUCET

James C. Ross, Seattle, Wash.

Application February 2, 1948, Serial No. 5,759

4 Claims. (Cl. 251—131)

This invention relates to faucets and valves of those kinds employed for controlling flow of fluid medium under pressure. More particularly, the invention has reference to improvements in the construction, application and functional relationship of the various parts for regulating and controlling the flow of water, air, steam or other fluid medium that may be brought to the valve or faucet under pressure.

It is the principal object of my invention to provide a packless faucet, or valve, of all metal, or metal and composition construction, that simplifies the design, lessens the expense of manufacture, provides for easier control, and which otherwise improves upon the faucets of my United States patents issued under Nos. 1,950,749 and 2,028,923.

It is also an object of my invention to provide a faucet for domestic use having an easy opening action, and having a self-closing action without the objectionable water hammer that is common to many of the so-called self-closing or spring closed faucets.

Another object of my invention is to provide a faucet, especially adapted for domestic use, having its main housing, spout and attaching nipple all cast in a single, integral piece, and the casting designed to contain therein, as an easily and quickly removable interchangeable and replaceable unit, a valve housing containing the flow regulating valve and some of the valve actuating members.

Another object of the invention is to provide a faucet wherein all main parts are so designed as to adapt them to be economically made from "bar stock" materials.

Yet another object of the invention is to provide a faucet or valve of the character above set forth, wherein provision is made for the selective and interchangeable use of bushings in the inlet passage of the housing for limiting the maximum delivery of the fluid medium through the faucet or valve.

Still further objects and advantages of the invention reside in the details of construction and combination of parts as will hereinafter be fully described.

In accomplishing the above mentioned and other objects of the invention, I have provided the improved details of construction, the preferred forms of which are illustrated in the accompanying drawings, wherein—

Fig. 1 is a central, vertical section of a faucet embodying the improvements of the present invention therein.

Fig. 2 is a side view of the replaceable valve unit, removed from the main housing or body of the faucet.

Fig. 3 is a horizontal, sectional detail taken on the line 3—3 in Fig. 1.

Fig. 4 is a sectional detail of the valve housing, or cylinder, showing the flow controlling valve member in an opened position.

Fig. 5 is a side view of the valve opening member as modified to provide for holding the valve opened to various degrees.

Referring more in detail to the drawings—

In one of the present preferred forms of construction, as seen in Fig. 1, the faucet comprises a main housing, designated by reference numeral 10. This comprises a single casting providing therein a chamber 12 which has an outlet at one side leading into a horizontally extending spout 13 that is formed as an integral part of the housing. In the base wall 14 of the chamber, is an opening 15 that leads cylindrical, downwardly into a downwardly extending nipple 16; the nipple 16 being exteriorly threaded, as at 17, for its connection by the usual means, with a water supply pipe line connection or the like, not shown.

The base wall 14 of the housing 10 is formed immediately about the nipple 16 with a flat under surface 18 that is adapted to engage flatly against the top surface of a support, such as the flange of a basin or sink through which the nipple is extended, for securement by threading a nut or the like onto the nipple or shank 16 and tightening it against the under side of the support.

Formed in the top wall of the chamber 12 is an interiorly threaded opening 20. This is coaxially aligned with the opening 15 and nipple 16. The upper end portion of the opening 20 is surrounded by an exteriorly threaded nipple 21, integral with and extending upwardly from the housing 10 and onto which nipple a bonnet 23 is removably threaded, the bonnet mounting thereon the valve opening member as will presently be explained.

Contained removably within the housing 10 is the valve housing 25 which, in Fig. 2, has been shown in side view and removed from the main housing 10. This valve housing is of tubular form and is provided exteriorly along its upper end portion with threads 26 and at the upper end is equipped with a wrench head portion 27. The lower end portion of the valve housing 25, designated at 25a, is of reduced diameter, and comprises approximately the lower one-third of the length of the valve housing. A straight, cylindrical portion 25c extends downwardly from the threaded portion 26, terminating at its lower end in an annular, conically inclined, downwardly facing shoulder 29 below which shoulder the housing continues in a short cylindrical portion 25d that joins at its lower end with the upper end of a downwardly tapered portion 25b that merges into the upper end of the cylindrical portion 25a.

The valve housing 25 may be inserted into the main housing 10, small end first, through the housing opening 20 and the threads 26 engaged with the threads of the opening 20, and threaded thereinto to the position of Fig. 1, wherein it is shown that the lower end of the cylindrical portion 25c fits snugly within the upper end of opening 15, with the downwardly facing shoulder 29 seated in a water tight joint against a similarly sloped upwardly facing seat 30. The seat 30 is formed in the opening 15, and the part 25d of the valve housing fits closely in the portion of opening 15 that is immediately below the shoulder 30. The lower end portion 25a of the valve housing, or reduced diameter, extends down into the nipple 16 with slight clearance as noted in Fig. 1.

With the valve housing 25 applied to the main housing 10 as shown in Fig. 1, the bonnet 23 may be applied, by threading it into the nipple 21 and it is intended that this shall seat against the wrench head of the valve housing as shown in Fig. 1, as a lock.

Formed coaxially of and within the upper end portion of the valve housing 25 is a cylindrical bore 32 of substantial diameter and of such depth that when the parts are assembled as in Fig. 1, its lower end is approximately at the level of the bottom of chamber 12. Formed in the housing and opening from the lower end of the bore 32 into the chamber 12 are outlets or ports 35. Extended into the valve housing, from its lower end, is a cylindrical bore 36 of about two-thirds the diameter of bore 32 and which terminates at its upper or inner end in a conical, downwardly facing seat 37. From the inner end of bore 36 and within the seat 37, an upwardly tapered bore 38 leads coaxially of the housing into the lower end of bore 32. Also, as seen in Figs. 1 and 3, a plurality of small holes 39 are directed downwardly from the bottom surface of bore 32 and into the bore 38 just above the seat 37 to eliminate restriction of outflow through this tapered bore.

Flow of water through the faucet is controlled by a valve member designated in its entirety by reference character V. This comprises a round lower end portion 42 which I refer to as the valve head, and an integral elongated, upwardly tapered stem 43 that is adapted to be contained in the tapered bore 38 and to extend into the upper end bore 32 of the valve housing. At its upper end, the head 42 is formed with a peripheral, upwardly facing, conically tapered shoulder 44, adapted to close in a water tight joint against the seat 37. When the head is so seated, the tapered stem 43 closely fits in the bore 38. When the valve is moved downwardly from closed position, the head is unseated, as in Fig. 4, the stem 43 provides clearance about it for flow of water through the passage 38, and port holes 39 into the lower end of bore 32 and from this into the chamber 12 for outflow through the spout 13.

The valve head 42 is normally held seated, and will be automatically moved to closed position by upward pressure thereagainst of the fluid medium under control. For the manual opening and control of the valve element, I have provided a piston valve member 50 that is slidably contained in the bore 32 and which rests against the upper end of valve stem 43. A control pin 52 is slidable through an axial bore 54 in the bonnet 23 and continuing through a cylindrical post 55 fixed centrally on top of the bonnet and coaxal of the pin.

Telescopically slidable on the post 55 is a sleeve 56 which, at its upper end, has a metal cushion pad 58 fixed therein. The upper end of pin 52 engages against this pad. Opposed shoulders on the upper end of the post and lower end of the sleeve respectively, as at 57 in Fig. 1, limit the upward travel of the sleeve.

By pressing downwardly on pad 58, the sleeve 56 may be shifted downwardly thus, through pin 52 and piston 50, to move the valve 43 downwardly and open the passage 38 for flow of water through the faucet body. The extent of opening of the valve will be in accordance with the extent to which the metal cushion pad is depressed. As soon as downward pressure is removed from the pad, the opposing pressure of incoming water against the valve head returns the valve to a closed position and holds it there.

In order to retard the closing action sufficiently to overcome any jar, vibration, or water hammer, the piston 50 may be formed with a small hole as at 60 in Fig. 1 that will admit water to the top side of the piston while the valve is open. Then, with the closing action, the trapped water is restricted in outflow and the valve closing action is retarded accordingly. In lieu of providing the piston with the hole, it might be made very slightly loose for the passage of water to and from the upper side thereof. The overcoming of water hammer is important since it eliminates not only the undesirable noise and vibration but also the jarring loose of scale and damage to pipe joints.

It is anticipated also that where it is desirable to have manual control, or to provide for holding the valve open to supply any definite amount of fluid, the pin 52 will be fixed at its upper end in the pad 58 as has been indicated in dotted lines in Fig. 1, and on its lower end portion will have a projecting stud latch 62 thereon adapted for sliding engagement with a helical cam surface 63 formed in a recess 64 in the bonnet 23. The latch does not interfere with the valve being pushed downward by the pin to any open position, but by turning the pad 58 so as to engage the latch 62 with the cam surface, a manual opening or closing adjustment of the valve may then be made by the rotative adjustment of the pin 52. The closing action then will be only to the extent permitted by the latch 62 and cam surface.

In Fig. 5, I have shown, as a modification or alternative detail, a sleeve 56 that is provided along one side with a vertical slot 65 through which a stud 66 that is fixed in the post, extends. The slot permits free longitudinal movement of the sleeve for opening and automatic closing of the valve. However, in order that the valve might be held in any one of a plurality of open positions, I have formed the slot with a succession of lateral notches 67 in which the stud may be received by a slight rotative movement of the sleeve, thus to hold the valve open to the desired extent to which the sleeve is depressed.

To limit the maximum flow of water through the faucet to different amounts, I have provided for the interchangeable use of bushings in the water inlet or entrance to the valve housing.

Such a bushing is shown at 70 in Fig. 1 and it is threaded into the lower end of the bore 36. By use of bushings, with passages of different diameter, the maximum delivery will be determined accordingly and can be restricted to any predetermined amount.

The removable, replaceable valve unit of the present faucet can most economically be made of bar stock, as this lends itself to automatic screw machine manufacture, and while it is indicated that the main housing is cast, this also might be made of bar stock and the parts assembled.

In the present device, the valve is moved to and held in closed position by the pressure of the controlled medium. Thus there are various incidental advantages. For example, whenever the supply is cut off and pressure relieved, the valves will open and effect an automatic draining of the faucet. Then, should the supply unexpectedly come on, the valves will be automatically closed by the pressure of said supply and prevent any accidental flooding.

Another advantage and desirable feature is that the valves cannot be jammed or injured. Furthermore, the free floating arrangement of valve permits it to rotate under the action of flowing water and this results in the valve seating in different position each time and scoring or undesirable wear on the valve and seat avoided.

There is also the advantage that the valve has a retarded or delayed closing action that is very desirable since it eliminates water hammer or jar and the objectionable results of such action. The delayed action may be to more or less degree as desired.

It is also herein provided that the maximum flow may be controlled and changed by the interchangeable and selective use of the bushing 70, and in this way a great saving of water may be made.

The relationship of valves to valve passages and valve actuating means is such that valve chatter is eliminated.

Having thus described my invention, what I claim as new therein and desire to secure by Letters Patent is:

1. In a faucet, or the like, a valve housing having a passage for flow of the controlled medium, said passage having a dash pot chamber at one end with outlets opening therefrom, and being formed in its other end portion with a valve seat, and having an elongated conically tapered portion leading from said seat into the dash pot chamber, a valve member applied to said passage having a valve head adapted to be closed against the valve seat by pressure of the controlled medium thereagainst, and having a conically tapered stem contained in the tapered portion of the passage and adapted to fit thereto when the valve is closed and to extend into the dash pot chamber, a retarding piston movable in the chamber, and manual means for actuating the piston against said stem for opening the valve; said conically tapered portion of the valve passage having auxiliary channels leading from near its larger end into the dash pot chamber.

2. A faucet comprising a main housing formed with a chamber having a dispensing outlet, and provided in its base wall with an inlet and in its top wall with a service opening, a tubular valve housing removably applied to the said main housing through and serving as a closure for the service opening and extended through the chamber and having its lower end portion seated within said inlet in a fluid tight joint; said valve housing having an axial dash pot chamber leading downwardly thereinto from its upper end and there being ports opening from the lower end of said dash pot chamber into the chamber of the main housing and having an axial bore leading upwardly thereinto from its lower end terminating in a downwardly facing valve seat, and a continuing conically tapered channel leading from within said seat and coaxially of the valve housing into the lower end of said dash pot chamber, a bonnet fixedly applied over the upper end of the valve housing, a valve disposed in the said valve housing having a conically tapered stem portion contained within and tapered to fit the conically tapered channel with its upper end portion extended into the dash pot chamber and having a valve head at its lower end contained within the lower end axial bore of the valve housing and adapted to be closed against said valve seat under pressure of the controlled medium, a retarding piston movable in the dash pot chamber and engaged against the upper end of the stem of said valve for unseating the valve head, a push rod slidably mounted in the bonnet and engaging the piston; for its downward actuation; said bonnet being formed with a downwardly facing helically inclined cam surface coaxial of the push rod and said push rod having a stud thereon that is movable, by rotative adjustment of the push rod, out of contact with the cam surface, or by another rotative adjustment into contact therewith for a controlled opening or controlled closing movement of the valve.

3. A faucet comprising a main housing formed with a chamber having a dispensing outlet, and provided in its base wall with an inlet and in its top wall with a service opening, a tubular valve housing removably applied to the said main housing through and serving as a closure for the service opening and extended through the chamber and having its lower end portion seated within said inlet in a fluid tight joint; said valve housing having an axial dash pot chamber leading downwardly thereinto from its upper end and there being ports opening from the lower end of said dash pot chamber into the chamber of the main housing and having an axial bore leading upwardly thereinto from its lower end terminating in a downwardly facing valve seat, and a continuing conically tapered channel leading from within said seat and coaxially of the valve housing into the lower end of said dash pot chamber, a bonnet fixedly applied over the upper end of the valve housing, a valve disposed in the said valve housing having a conically tapered stem portion contained within and tapered to fit the conically tapered channel with its upper end portion extended into the dash pot chamber and having a valve head at its lower end contained within the lower end axial bore of the valve housing and adapted to be closed against said valve seat under pressure of the controlled medium, a retarding piston movable in the dash pot chamber and engaged against the upper end of the stem of said valve for unseating the valve head, a push rod slidably mounted in the bonnet and engaging the piston for its downward actuation; said push rod having a push button fixed thereto and being rotatable thereby, and in one position of rotary adjustment being freely movable up and down to its full limits, and there being coacting means fixed relative to the pin and relative to the bonnet adapted by rotative adjustment of the rod to another position, to be engaged for holding the valve in an open position.

4. A faucet comprising a main housing formed with a chamber having a dispensing outlet, and provided in its base wall with an inlet and in its top wall with a service opening, a tubular valve housing removably applied to the said main housing through and serving as a closure for the service opening and extended through the chamber and having its lower end portion seated within said inlet in a fluid tight joint; said valve housing having an axial dash pot chamber leading downwardly thereinto from its upper end and there being ports opening from the lower end of said dash pot chamber into the chamber of the main housing and having an axial bore leading upwardly thereinto from its lower end terminating in a downwardly facing valve seat, and a continuing conically tapered channel leading from within said seat and coaxially of the valve housing into the lower end of said dash pot chamber, a bonnet fixedly applied over the upper end of the valve housing, a valve disposed in the said valve housing having a conically tapered stem portion contained within and tapered to fit the conically tapered channel with its upper end portion extended into the dash pot chamber and having a valve head at its lower end contained within the lower end axial bore of the valve housing and adapted to be closed against said valve seat under pressure of the controlled medium, a retarding piston movable in the dash pot chamber and engaged against the upper end of the stem of said valve for unseating the valve head, a push rod slidably mounted in the bonnet and engaging the piston; for its downward actuation; said bonnet having a cylindrical post fixed thereon and through which the push rod extends, and said push rod being equipped at its upper end with a tubular, coaxial sleeve that moves up and down with the push rod and is telescopically and rotatable on the said post; said sleeve having a longitudinal slot therein and lateral notches along and opening into said slot, and said post having a stud fixed thereon and extended into said slot and adapted by longitudinal movement and turning of the sleeve to be selectively seated in the notches to hold the valve in various open positions.

JAMES C. ROSS.

References Cited in the file of this patent
UNITED STATES PATENTS

| Number | Name | Date |
| --- | --- | --- |
| 675,635 | Lyon | June 4, 1901 |
| 814,975 | Mason | Mar. 13, 1906 |
| 834,395 | Montgomery | Oct. 30, 1906 |
| 1,436,650 | Gilbert | Nov. 28, 1922 |
| 1,505,650 | Lewis | Aug. 19, 1924 |
| 1,901,979 | Meusy | Mar. 21, 1933 |
| 1,950,749 | Ross | Mar. 13, 1934 |
| 2,028,923 | Ross | Jan. 28, 1936 |